United States Patent
Rode et al.

(10) Patent No.: US 9,150,226 B2
(45) Date of Patent: *Oct. 6, 2015

(54) MOUNTING RING

(75) Inventors: John E. Rode, Fonda, NY (US); Sean E. Strait, Fonda, NY (US)

(73) Assignee: Amsted Rail Company, Inc., Chicago, IL (US)

(*) Notice: Subject to any disclaimer, the term of this patent is extended or adjusted under 35 U.S.C. 154(b) by 1440 days.

This patent is subject to a terminal disclaimer.

(21) Appl. No.: 12/492,928

(22) Filed: Jun. 26, 2009

(65) Prior Publication Data

US 2009/0258714 A1 Oct. 15, 2009

Related U.S. Application Data

(60) Division of application No. 10/945,074, filed on Sep. 20, 2004, now Pat. No. 8,657,299, and a continuation-in-part of application No. 10/891,597, filed on Jul. 15, 2004, now Pat. No. 7,563,050.

(51) Int. Cl.
*B61F 15/20* (2006.01)
*B61F 15/22* (2006.01)
(Continued)

(52) U.S. Cl.
CPC ............... *B61F 15/20* (2013.01); *B23P 11/00* (2013.01); *B61F 15/22* (2013.01); *F16J 15/0887* (2013.01); *Y10T 29/49826* (2015.01); *Y10T 29/49865* (2015.01); *Y10T 29/49945* (2015.01); *Y10T 29/49947* (2015.01); *Y10T 156/10* (2015.01);
(Continued)

(58) Field of Classification Search
USPC ............... 285/340; 403/1, 202, 203, 255; 277/411, 910
See application file for complete search history.

(56) References Cited

U.S. PATENT DOCUMENTS 1,399,069 A 12/1921 Morgan
2,076,218 A 4/1937 Alden
(Continued)

FOREIGN PATENT DOCUMENTS

DE 1075909 2/1960
EP 0301731 A2 2/1989
(Continued)

OTHER PUBLICATIONS

Restriction for related U.S. Appl. No. 10/891,597, mailed Nov. 9, 2004.
(Continued)

*Primary Examiner* — Daniel Wiley
(74) *Attorney, Agent, or Firm* — Edward J. Brosius

(57) ABSTRACT

Mounting rings and methods for mounting structures to shafts are provided. The rings and methods may be used to mount other rings or housings to a shaft. The rings are characterized by having flexible inner diameters that can deflect under a radial load. The radial deflection of the inner diameter permits the rings to deflect and engage an outer diameter of a shaft. The engagement of the rings with a shaft provides at least some resistance to movement, for example, rotation and/or axial displacement, of the shaft relative to the ring and structure. In one aspect, the ring has a closed, hollow, construction, for example, a circular, oval, or polygonal closed, hollow construction. The ring may include a plurality of indentations, such as slots, on the inside diameter of the ring that may relieve at least some of the circumferential stress in the ring. Methods for using the rings to mount a structure to a shaft are also disclosed.

20 Claims, 11 Drawing Sheets

(51) Int. Cl.
 *F16J 15/08*     (2006.01)
 *B23P 11/00*    (2006.01)

(52) U.S. Cl.
 CPC .......... *Y10T 403/10* (2015.01); *Y10T 403/7058* (2015.01)

(56) References Cited

U.S. PATENT DOCUMENTS

| | | | |
|---|---|---|---|
| 2,230,912 A | 2/1941 | Sanders | |
| 2,247,001 A | 6/1941 | Powers | |
| 2,276,406 A * | 3/1942 | Magrum | 277/510 |
| 2,309,658 A | 2/1943 | Miller | |
| 2,391,007 A | 12/1945 | Buckendale | |
| 2,426,963 A | 9/1947 | Ball et al. | |
| 2,438,214 A | 3/1948 | Horger | |
| 2,457,908 A | 1/1949 | Meyerhoefer | |
| 2,503,854 A * | 4/1950 | Trainor | 403/223 |
| 2,573,159 A | 10/1951 | Noe | |
| 2,739,615 A * | 3/1956 | Hugo | 285/223 |
| 2,782,079 A | 2/1957 | Kachnik | |
| 2,783,102 A | 2/1957 | Palmgren | |
| 2,859,033 A | 11/1958 | Rose | |
| 2,892,987 A | 6/1959 | Cedrone | |
| 2,958,551 A | 11/1960 | Rogers | |
| 3,007,600 A | 11/1961 | Homer | |
| 3,116,932 A | 1/1964 | Mallinckrodt | |
| 3,159,407 A | 12/1964 | Strohm | |
| 3,201,135 A | 8/1965 | Hayatian | |
| 3,396,975 A | 8/1968 | Otto | |
| 3,483,789 A * | 12/1969 | Wurzel | 411/517 |
| 3,494,682 A | 2/1970 | Keller | |
| 3,603,655 A | 9/1971 | Keller et al. | |
| 3,628,837 A | 12/1971 | Otto | |
| 3,672,735 A | 6/1972 | Keller et al. | |
| 3,685,841 A | 8/1972 | Keller | |
| 3,729,789 A | 5/1973 | Otto | |
| 3,790,238 A | 2/1974 | Otto | |
| 3,797,899 A | 3/1974 | Anderson | |
| 3,802,352 A | 4/1974 | Keller | |
| 3,833,277 A | 9/1974 | Jones et al. | |
| 4,072,328 A * | 2/1978 | Elliott | 285/148.28 |
| 4,105,226 A * | 8/1978 | Frey et al. | 285/148.21 |
| 4,130,066 A | 12/1978 | Mulcahy | |
| 4,136,748 A | 1/1979 | Dickerhoff | |
| 4,334,687 A | 6/1982 | Holzer et al. | |
| 4,346,637 A | 8/1982 | Janszen | |
| 4,363,278 A | 12/1982 | Mulcahy | |
| 4,367,053 A | 1/1983 | Stratienko et al. | |
| 4,376,254 A * | 3/1983 | Hellmann | 310/235 |
| 4,552,385 A | 11/1985 | Peting | |
| 4,645,217 A | 2/1987 | Honeycutt et al. | |
| 4,674,412 A | 6/1987 | Mulcahy et al. | |
| 4,819,949 A | 4/1989 | Otto | |
| 5,005,913 A | 4/1991 | Kittle et al. | |
| 5,017,025 A | 5/1991 | Williams | |
| 5,024,449 A | 6/1991 | Otto | |
| 5,037,214 A | 8/1991 | Dougherty | |
| 5,100,158 A | 3/1992 | Gardner | |
| 5,118,206 A | 6/1992 | Otto et al. | |
| 5,141,340 A | 8/1992 | Van Tonder | |
| 5,160,179 A * | 11/1992 | Takagi | 285/340 |
| 5,161,806 A | 11/1992 | Balsells | |
| 5,174,680 A | 12/1992 | Nakamura et al. | |
| 5,174,839 A | 12/1992 | Schultz et al. | |
| 5,278,352 A | 1/1994 | Schade | |
| 5,370,402 A | 12/1994 | Gardner et al. | |
| 5,380,102 A | 1/1995 | Sink | |
| 5,407,296 A | 4/1995 | Brown | |
| 5,411,348 A | 5/1995 | Balsells | |
| 5,440,184 A | 8/1995 | Samy et al. | |
| 5,462,367 A | 10/1995 | Davidson et al. | |
| 5,545,842 A | 8/1996 | Balsells | |
| 5,549,395 A | 8/1996 | Sink | |
| 5,549,397 A | 8/1996 | Rode | |
| 5,588,752 A | 12/1996 | Fetty | |
| 5,603,530 A * | 2/1997 | Guest | 285/105 |
| 5,603,532 A * | 2/1997 | Guest | 285/305 |
| 5,632,493 A | 5/1997 | Gardner | |
| 5,722,327 A | 3/1998 | Hawthorne et al. | |
| 5,794,538 A | 8/1998 | Pitchford | |
| 5,813,705 A * | 9/1998 | Dole | 285/321 |
| 5,858,415 A | 1/1999 | Bequette et al. | |
| 5,884,956 A | 3/1999 | Pasquin | |
| 5,975,533 A | 11/1999 | Hubbard et al. | |
| 6,026,774 A | 2/2000 | Kajihara et al. | |
| 6,062,548 A | 5/2000 | Nagao et al. | |
| 6,099,083 A | 8/2000 | Logan | |
| 6,126,321 A | 10/2000 | Fetty et al. | |
| 6,161,962 A | 12/2000 | French et al. | |
| 6,183,232 B1 | 2/2001 | Bequette et al. | |
| 6,312,161 B1 | 11/2001 | Williams | |
| 6,322,157 B1 | 11/2001 | DeWald et al. | |
| 6,367,802 B1 * | 4/2002 | Knapp | 277/314 |
| 6,371,033 B1 | 4/2002 | Smith et al. | |
| 6,386,764 B1 | 5/2002 | Moore et al. | |
| 6,409,177 B1 * | 6/2002 | Johnston | 277/551 |
| 6,499,771 B1 * | 12/2002 | Snyder et al. | 285/319 |
| 6,505,972 B1 | 1/2003 | Harbottle et al. | |
| 6,535,135 B1 | 3/2003 | French et al. | |
| 6,561,559 B1 | 5/2003 | Skiller et al. | |
| 6,644,667 B2 * | 11/2003 | Grondahl | 277/355 |
| 6,722,657 B2 | 4/2004 | Hood et al. | |
| 6,802,780 B2 * | 10/2004 | Glowacki et al. | 464/162 |
| 6,835,084 B2 | 12/2004 | Poon et al. | |
| 6,913,292 B2 * | 7/2005 | Snyder et al. | 285/340 |
| 7,121,593 B2 * | 10/2006 | Snyder et al. | 285/340 |
| 7,219,938 B2 * | 5/2007 | Brister et al. | 295/42 |
| 7,500,699 B2 * | 3/2009 | Snyder et al. | 285/340 |
| 7,534,047 B2 | 5/2009 | Reed | |
| 7,563,050 B2 * | 7/2009 | Strait | 403/365 |
| 7,591,107 B2 | 9/2009 | Labuschagne | |
| 7,607,836 B2 | 10/2009 | Mason et al. | |
| 7,712,747 B2 * | 5/2010 | Hu | 279/43.1 |
| 7,900,973 B2 * | 3/2011 | Herberg et al. | 285/331 |
| 7,955,001 B2 | 6/2011 | Reed et al. | |
| 8,109,674 B2 | 2/2012 | Hubbard | |
| 8,226,299 B2 | 7/2012 | Hubbard et al. | |
| 8,303,001 B2 * | 11/2012 | Oh | 285/340 |
| 8,317,202 B2 * | 11/2012 | Rode et al. | 277/572 |
| 8,322,755 B2 * | 12/2012 | Kluss et al. | 285/340 |
| 8,333,440 B2 | 12/2012 | Chen | |
| 8,342,535 B2 | 1/2013 | Lattime et al. | |
| 8,356,941 B2 | 1/2013 | Mason et al. | |
| 8,356,945 B2 | 1/2013 | Mason et al. | |
| 8,360,651 B1 | 1/2013 | Fetty et al. | |
| 8,485,533 B2 | 7/2013 | Park et al. | |
| 8,533,957 B2 | 9/2013 | Spurlock et al. | |
| 8,596,872 B2 | 12/2013 | Pruden | |
| 8,696,212 B2 | 4/2014 | Hubbard et al. | |
| 2002/0148171 A1 | 10/2002 | Labuschagne | |
| 2003/0006655 A1 | 1/2003 | Zhang | |
| 2003/0067170 A1 * | 4/2003 | Snyder et al. | 285/340 |
| 2005/0052043 A1 | 3/2005 | Brister et al. | |
| 2005/0078897 A1 | 4/2005 | Zhang | |
| 2006/0018582 A1 | 1/2006 | Gradu et al. | |
| 2006/0119047 A1 * | 6/2006 | Riley | 277/372 |
| 2006/0251352 A1 | 11/2006 | Reed | |
| 2007/0169663 A1 | 7/2007 | Berg et al. | |
| 2008/0085069 A1 | 4/2008 | Toth et al. | |
| 2008/0226212 A1 | 9/2008 | Mason et al. | |
| 2009/0080824 A1 | 3/2009 | Joki et al. | |
| 2009/0123099 A1 | 5/2009 | Dickerhoff et al. | |
| 2009/0127795 A1 | 5/2009 | Lattime et al. | |
| 2010/0098369 A1 | 4/2010 | Reed et al. | |
| 2010/0272381 A1 | 10/2010 | Hubbard | |
| 2010/0322544 A1 | 12/2010 | Hubbard et al. | |
| 2011/0064347 A1 | 3/2011 | Hubbard et al. | |
| 2011/0085755 A1 | 4/2011 | Pruden | |
| 2011/0123142 A1 | 5/2011 | Mason et al. | |
| 2011/0216993 A1 | 9/2011 | Mason et al. | |
| 2012/0027330 A1 | 2/2012 | Fetty | |
| 2012/0082407 A1 | 4/2012 | Fetty | |
| 2012/0195540 A1 | 8/2012 | Hubbard et al. | |

(56) References Cited

U.S. PATENT DOCUMENTS

| | | |
|---|---|---|
| 2012/0317814 A1 | 12/2012 | Spurlock et al. |
| 2013/0125367 A1* | 5/2013 | Rode et al. .................. 29/428 |
| 2013/0230265 A1 | 9/2013 | Hubbard et al. |
| 2014/0161381 A1 | 6/2014 | Buchanan et al. |
| 2014/0241655 A1 | 8/2014 | Buchanan et al. |

FOREIGN PATENT DOCUMENTS

| | | |
|---|---|---|
| EP | 0301731 A3 | 2/1989 |
| EP | 0202702 B1 | 4/1990 |
| EP | 0450793 A2 | 10/1991 |
| EP | 0450793 A3 | 10/1991 |
| EP | 0301731 B1 | 4/1992 |
| EP | 0509627 A2 | 10/1992 |
| EP | 0509627 A3 | 10/1992 |
| EP | 0697533 A1 | 2/1996 |
| EP | 0701315 A1 | 3/1996 |
| EP | 0509627 B1 | 9/1996 |
| EP | 0774393 A2 | 5/1997 |
| EP | 0774393 A3 | 9/1998 |
| EP | 0697533 B1 | 6/2000 |
| EP | 0697533 B2 | 6/2000 |
| EP | 0697533 B9 | 6/2000 |
| EP | 0701315 B1 | 11/2001 |
| EP | 1398636 A2 | 3/2004 |
| EP | 1398636 A3 | 5/2004 |
| EP | 0925456 B2 | 1/2005 |
| EP | 1398636 B1 | 11/2006 |
| EP | 1663752 B1 | 11/2007 |
| EP | 1292831 B1 | 10/2009 |
| EP | 2246581 A1 | 11/2010 |
| EP | 2573413 A1 | 3/2013 |
| EP | 2246581 B1 | 5/2013 |
| FR | 2514443 | 4/1983 |
| GB | 696684 | 9/1953 |
| GB | 764231 | 12/1956 |
| GB | 1349340 | 4/1974 |
| GB | 2013588 | 8/1979 |
| JP | 2003269471 A1 | 9/2003 |
| WO | 9811356 A1 | 3/1998 |
| WO | 0175320 A1 | 10/2001 |
| WO | 0201086 A2 | 1/2002 |
| WO | 0220284 A2 | 3/2002 |
| WO | 0221004 A2 | 3/2002 |
| WO | 0238428 A1 | 5/2002 |
| WO | 03084710 A1 | 10/2003 |
| WO | 2005025960 A2 | 3/2005 |
| WO | 2006014934 A1 | 2/2006 |
| WO | 2006094031 A1 | 9/2006 |
| WO | 2009067575 A2 | 5/2009 |
| WO | 2009067575 A3 | 5/2009 |
| WO | 2011040896 A1 | 4/2011 |
| WO | 2012173652 A1 | 12/2012 |
| WO | 2013028312 A1 | 2/2013 |

OTHER PUBLICATIONS

Office Action for related U.S. Appl. No. 10/891,597 mailed Mar. 18, 2005.
Final Office Action for related U.S. Appl. No. 10/891,597, mailed Aug. 30, 2005.
Office Action for related U.S. Appl. No. 10/891,597, mailed Mar. 2, 2006.
Final Office Action for related U.S. Appl. No. 10/891,597, mailed Jul. 18, 2006.
Final Office Action for related U.S. Appl. No. 10/891,597, mailed Nov. 22, 2006.
Decision on Appeal for U.S. Appl. No. 10/891,597, mailed Sep. 24, 2008.
Office Action for related U.S. Appl. No. 10/891,597, mailed Dec. 18, 2008.
Office Action for related U.S. Appl. No. 10/945,074, mailed Aug. 28, 2006.
Final Office Action for related U.S. Appl. No. 10/945,074, mailed Sep. 10, 2007.
Office Action for related U.S. Appl. No. 10/945,074, mailed May 22, 2008.
Final Office Action for related U.S. Appl. No. 10/945,074, mailed Dec. 11, 2008.
Advisory Action for related U.S. Appl. No. 10/945,074, mailed Jun. 18, 2009.
NSK Ltd., NSK Motion & Control, "Bearings for Railing Rolling Stock," 2000, pp. 1-58.
Timken, "AP[TM] Roller Bearings Service Limits," The Timken Company, 08-03 Order No. 8214, U.S.A., 2003, p. 1.
Timken, "Seal Specification Guide," The Timken Company, 60M-12-01-11 Order No. 7533, U.S.A., 2001, pp. 1-204.

* cited by examiner

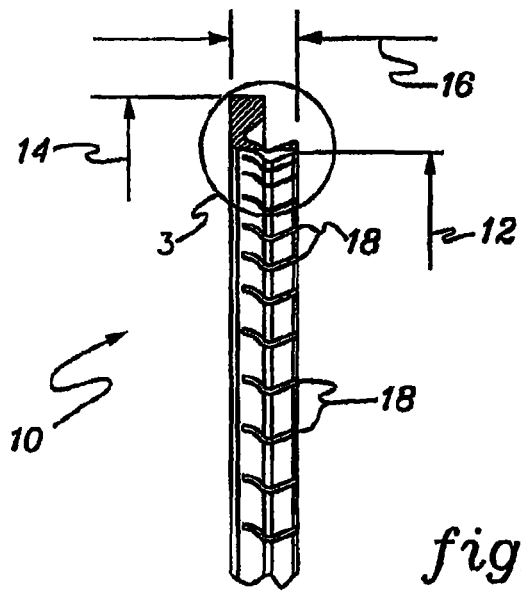
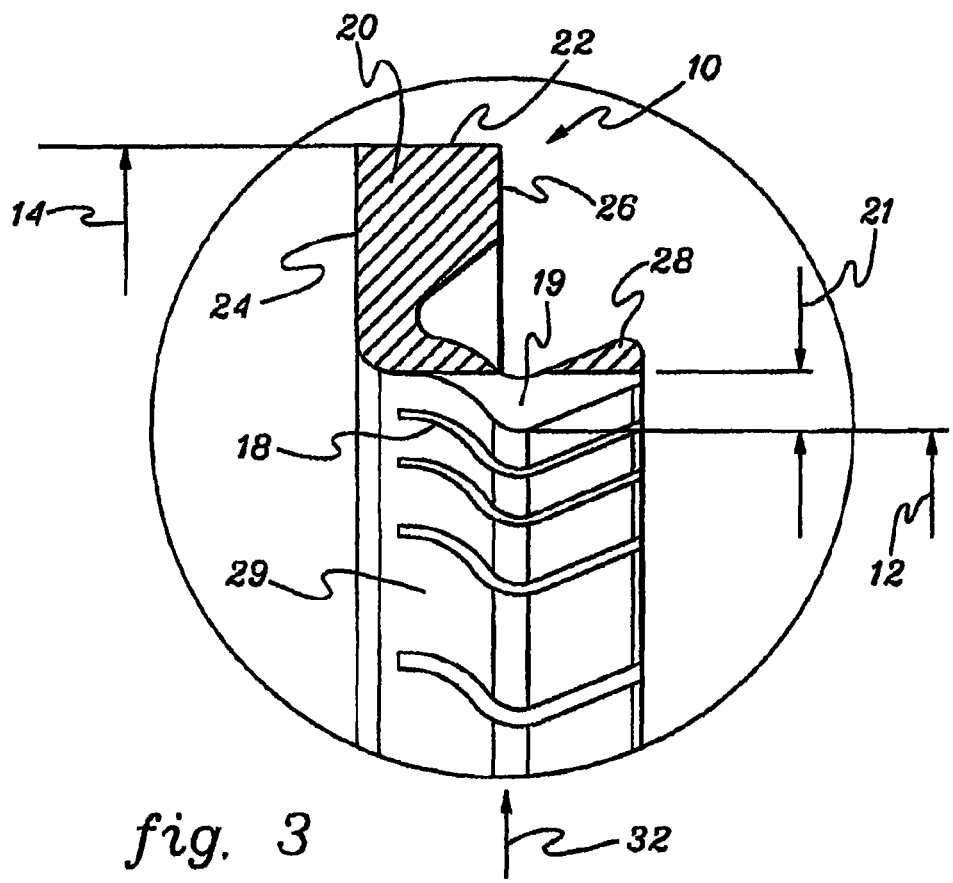

MOUNTING RING

CROSS REFERENCE TO RELATED APPLICATIONS

This application is a divisional application of U.S. application Ser. No. 10/945,074 filed on Sep. 20, 2004 and entitled "MOUNTING RINGS FOR SHAFTS," now U.S. Pat. No. 8,657,299, which is a continuation-in-part application of U.S. application Ser. No. 10/891,597 filed on Jul. 15, 2004 and entitled "RINGS FOR MOUNTING STRUCTURES TO SHAFTS AND METHODS OF USING SUCH RINGS," now U.S. Pat. No. 7,563,050, disclosures of which are incorporated by reference herein in their entirety.

This application is also related to pending application Ser. No. 12/470,262, filed on May 21, 2009, which is a divisional application of U.S. application Ser. No. 10/945,074 filed on Sep. 20, 2004 and entitled "MOUNTING RINGS FOR SHAFTS," now U.S. Pat. No. 8,657,299.

FIELD OF THE INVENTION

The present invention relates, generally, to a ring for mounting structures to a shaft, particularly, to a ring having a resilient inside diameter that can engage a shaft and provide at least some resistance to relative movement between the ring and the shaft.

BACKGROUND OF THE INVENTION

The need often arises for mounting a structure to a shaft when conventional means, for example, mechanical fasteners, welding, or machining, are unfeasible or simply impossible. For instance, when it is necessary to mount a structure onto an existing shaft in an existing assembly, it is sometimes difficult to mount a structure, for example, a ring or bearing housing, to the shaft. Existing shafts may not be accessible for machining, or they may have a metallurgy that is incompatible with welding or machining, or the shaft dimensions may have too large a tolerance where conventional mounting means are undesirable or impractical.

The present inventors encountered such a situation where conventional mounting means were incompatible with the condition of the shaft to which they were interested in mounting a structure, specifically, mounting a bearing backing plate. The inventors desired to mount a circular disk-shaped, bearing-backing ring to an existing forged or cast train axle. However, the existing train axle was a forged axle having an outside diameter that varied by about +/−0.030 inches. The inventors found that this forged axle did not lend itself to conventional mounting methods, for example, welding or machining. Also, the relatively large tolerance of the outside diameter required that whatever was mounted to the shaft be able to accommodate the variation in diameter while providing at least some resistance to the rotation of the backing plate relative to the shaft.

Aspects of the present invention provide the means for mounting the backing ring to the shaft. Moreover, the inventors recognized that aspects of the present invention were not limited to use with forged or cast train axles, but could be used in any situation in which it was desirable to mount a structure, any structure, on to any type of shaft.

SUMMARY OF ASPECTS OF THE INVENTION

One aspect of the present invention is a ring for mounting a structure to a shaft, the ring having a first surface adapted to engage the structure; and a radially inner surface adapted to flexibly engage the shaft and, when engaged with the shaft, provide at least some resistance to movement, for example, rotation and/or axial displacement, of the shaft relative to the ring. In one aspect of the invention, the radially inner surface comprises a plurality of indentations, for example, slits, slots, or holes. In another aspect of the invention, the ring may be a metallic ring or a plastic ring. In another aspect of the invention, the invention may include a means for providing a substantially fluid-tight seal, for example, between the shaft and the ring, for instance, a sealing compound.

Another aspect of the invention is a method for mounting a structure to a shaft, the method including: providing a ring having a first surface adapted to engage the structure, and having a radially inner surface adapted to deflect and engage the shaft; mounting the structure to the ring; slidably engaging the ring onto the shaft whereby the radially inner surface of the ring engages the shaft; and providing at least some resistance to movement, for example, rotation and/or axial displacement, of the shaft relative to the ring. In one aspect of the invention, slidably engaging the ring on the shaft further comprises radially deflecting the radially inner surface of the ring. In another aspect of the invention, the method further comprises providing a substantially fluid-tight seal, for example, between the ring and the shaft.

A further aspect of the invention is an arrangement for mounting a structure to a shaft, the arrangement including: a structure; a shaft to which the structure is to be mounted; and a ring mounted to the structure, the ring comprising: a first surface adapted to engage the structure; and a radially inner surface adapted to flexibly engage the shaft and, when engaged with the shaft, provide at least some resistance to movement, for example, rotation and/or axial displacement, of the shaft relative to the ring. In one aspect of the invention, the structure may be a plate, a ring, a housing, a bearing, or a seal, among other structures. In another aspect of the invention, the arrangement may include a means for providing a substantially fluid-tight seal, for example, between the shaft and the ring, for instance, a sealing compound.

A further aspect of the invention is a ring for mounting a structure to a shaft, the ring comprising: a cross-section comprising a closed, hollow construction; a first surface adapted to engage the structure; and a radially inner surface adapted to flexibly engage the shaft and, when engaged with the shaft, provide at least some resistance to movement, for example, rotation and/or axial displacement, of the shaft relative to the ring. In one aspect, the closed, hollow construction comprises one of a circular, oval, and polygonal closed, hollow construction.

Another aspect of the invention is a method for mounting a structure to a shaft, the method comprising: providing a ring having a cross-section comprising a closed, hollow construction; a first surface adapted to engage the structure; and a radially inner surface adapted to deflect and engage the shaft; mounting the structure to the ring; slidably engaging the ring onto the shaft whereby the radially inner surface of the ring engages the shaft; and providing at least some resistance to movement, for example, rotation and/or axial displacement, of the shaft relative to the ring. In one aspect, providing at least some resistance to movement comprises at least some resistance to rotation of the shaft relative to the ring due to friction between the radially inner surface and the shaft.

A still further aspect of the invention is an arrangement for mounting a structure to a shaft, the arrangement including a structure; a shaft to which the structure is to be mounted; and a ring mounted to the structure, the ring having a cross-section comprising a closed, hollow construction; a first surface adapted to engage the structure; and a radially inner surface adapted to flexibly engage the shaft and, when engaged with the shaft, provide at least some resistance to movement, for example, rotation and/or axial displacement, of the shaft relative to the ring. In one aspect, the arrangement further comprises means for providing a substantially fluid-tight seal between the ring and the shaft.

Details of these aspects of the invention, as well as further aspects of the invention, will become more readily apparent upon review of the following drawings and the accompanying claims.

BRIEF DESCRIPTION OF THE FIGURES

The subject matter that is regarded as the invention is particularly identified and distinctly claimed in the claims at the conclusion of the specification. The foregoing and other objects, features, and advantages of the invention will be readily understood from the following detailed description of aspects of the invention taken in conjunction with the accompanying drawings in which:

FIG. 2 is a partial cross-sectional view of the ring shown in FIG. 1 as viewed along section lines 2-2 in FIG. 1.

FIG. 3 is a magnified detailed view of the cross-sectional shape identified by circle 3 in FIG. 2 according to one aspect of the invention.

DETAILED DESCRIPTION OF FIGURES

Figure 1:
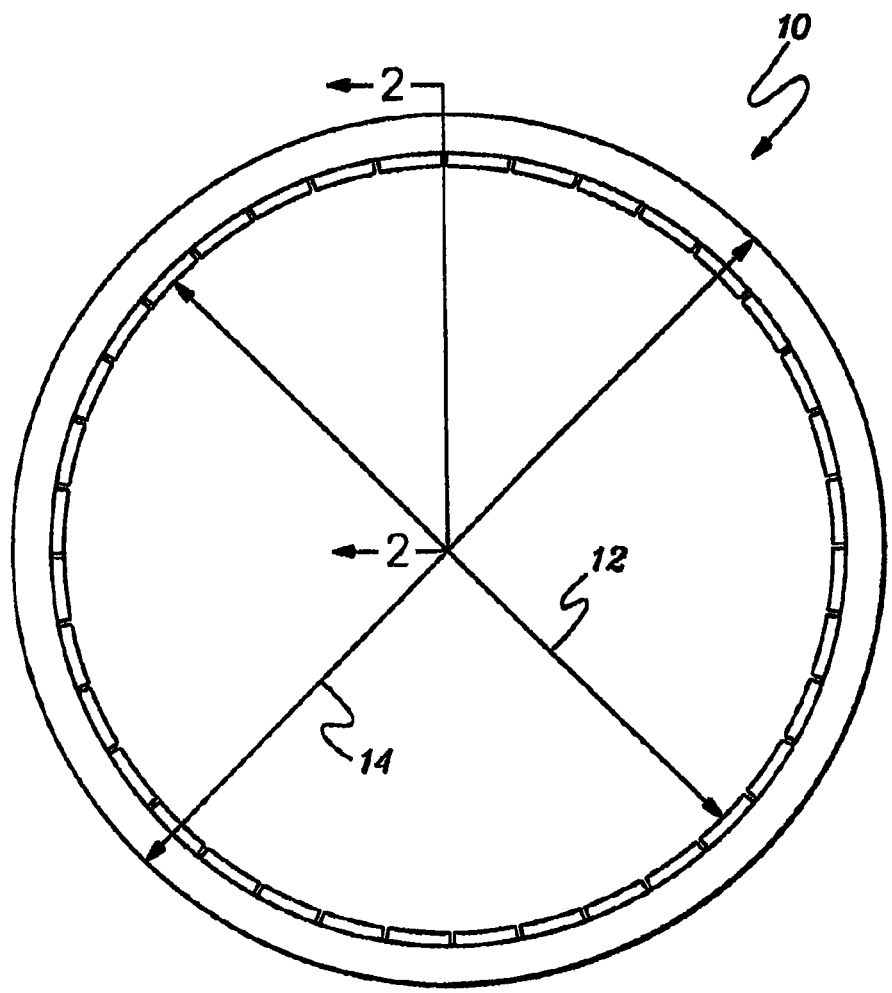
FIG. 1 is a plan view of a ring according to one aspect of the invention.

The details and scope of the aspects of the present invention can best be understood upon review of the attached figures and their following descriptions. FIG. 1 is a plan view of a ring 10 according to one aspect of the invention. Ring 10 has an inside diameter 12 and an outside diameter 14. FIG. 2 is a partial cross-sectional view of ring 10 shown in FIG. 1 as viewed along section lines 2-2 in FIG. 1. As shown in FIG. 2, ring 10 has a width 16 and, according to this aspect of the present invention, at least one indentation 18, for example, a slot or slit, and typically a plurality of indentations 18. According to one aspect of the invention, as discussed below, indentations 18 may take many different forms. However, to facilitate this discussion, indentation 18 will be referred to as a "slot" in the following discussion. FIG. 3 is a magnified detailed view of the cross section of ring 10 identified by circle 3 in FIG. 2. As shown in FIG. 3, section 2-2 shown in FIG. 1, passes through a slot 18 whereby a lateral surface 19 of slot 18 is shown without cross hatching in FIGS. 2 and 3.

Inside diameter 12, outside diameter 14, and width 16 may vary broadly depending upon the size of the installation in which ring 10 is used. For example, in one aspect of the invention, inside diameter 12 and outside diameter 14 may be as small as 0.125 inches or as large as 20 feet. In one aspect of the invention, the inside diameter 12 of ring 10 will typically vary from about 6 inches to about 3 feet, for example, between about 6 inches and about 1½ feet. In one aspect of the invention, the outside diameter 14 of ring 10 will typically vary from about 6 inches to about 3 feet, for example, between about 7 inches and about 2 feet. In one aspect of the invention, width 16 may be as small as 0.125 inches or as large as 2 feet. In one aspect of the invention, the width 16 of ring 10 will typically vary from about 0.25 inches to about 6 inches, for example, between about 0.25 inches and about 0.75 inches.

As shown in FIG. 3, the cross section of ring 10 includes a main section 20 having an outer surface 22 (comprising the outside diameter 14), a first lateral surface 24, and a second lateral surface 26, opposite first lateral surface 24. According to one aspect of the invention, main section 20 may take many shapes, for example, any shape that is compatible with the shape and function of the structure (not shown) that may be mounted to ring 10. According to one aspect of the invention, the cross section of ring 10 also includes a projection 28 extending from main section 20 and having an inner surface 29 comprising inside diameter 12. In the aspect of the invention shown in FIG. 3, projection 28 comprises a lateral extension from main section 20 providing an L-shaped appearance to the cross section of ring 10; however, projection 28 may take any shape or orientation that is compatible with the shaft (not shown) to which ring 10 is mounted. According to aspects of the invention, extension 28 is adapted to be flexible or resilient, and deflect or deform under load, for example, deflect or deform under a load in the radial direction as represented by arrow 32 in FIG. 3. The deflection or deformation of extension 28 under load may comprise elastic deflection or plastic deflection. According to this aspect of the invention, main section 20 may be mounted to another structure (not shown) and ring 10 may be mounted to a shaft (not shown) whereby inside diameter 12 is allowed to deflect or deform, for example, to accommodate any deviation from the diameter of the shaft and inside diameter 12 of ring 10.

In one aspect of the invention, slots 18 may be introduced to inner surface 29 of extension 28. For example, in one aspect, slots 18 may be provided to relieve at least some of the circumferential or "hoop" stress that may be created when mounting ring 10 onto a shaft. In one aspect of the invention, slots 18 provide at least some resiliency to ring 10, for example, to extension 28, whereby inside diameter 12 may deflect under load. Slots 18 may have a depth 21. Depth 21 may vary depending upon the thickness of extension 18. Depth 21 may also vary depending upon the degree of stress relief desired, among other things. In one aspect, as shown in FIG. 3, depth 21 of slot 18 is sufficient to penetrate through extension 28 whereby slots 18 penetrate the outer surface of extension 28. In another aspect of the invention, slots 18 do not penetrate the outer surface of extension 28.

In one aspect of the invention, the shaft (not shown) to which ring 10 is mounted has a diameter, for example, a nominal diameter or an actual diameter, that may be greater than inside diameter 12. In another aspect of the invention, the diameter of the shaft to which ring 10 is mounted may have a diameter that varies and may be greater than inside diameter 12 in some places and less than inside diameter 12 in other places. However, according to aspects of the present invention, deviations in the diameter of the shaft are accommodated by the flexibility of inside diameter 12, for example, the flexibility provided by slots 18. In one aspect of the invention, the flexibility of inside diameter 12 is sufficient to accommodate a shaft diameter whereby no indentations or slots 18 are required.

In one aspect of the invention, ring 10 may provide at least some fluid sealing between one side of ring 10 and the other side of ring 10. For example, in the aspect of the invention where indentations 18 are small or when no indentations are present, ring 10 may provide a barrier that limits the flow of a fluid, for example, a liquid or a gas, across ring 10. In another aspect of the invention, a means for providing a substantially fluid-tight seal may be provided between ring 10 and the shaft to which ring 10 is mounted. For example, in one aspect, a sealing material may be introduced to the interface between ring 10 and the shaft before, during, or after, ring 10 is mounted to the shaft. For example, a sealing compound, for instance, a silicone-based sealing compound, may be introduced to the interface, or a resilient device, for instance, an elastomeric ring or band, may be introduced to the interface. In one aspect of the invention, a room-temperature vulcanizing (RTV) silicone rubber may be used, for example, an RTV silicone rubber may be applied to the interface of ring 10 and the shaft before, during, or after, ring 10 is mounted to the shaft. In another aspect of the invention, one or more preformed plugs may be installed in the slots 18 in ring 10 before, during, or after, ring 10 is mounted to the shaft.

According to one aspect of the invention, when ring 10 is mounted on to a shaft, the normal load provided by the contact of inner surface 29 upon the outside diameter of the shaft is sufficient to provide at least some friction between the outside diameter of the shaft and inner surface 29 whereby at least some resistance, for example, some torsional resistance, is provided to the rotation of the shaft relative to ring 10. In one aspect of the invention, the friction provided by the contact between inner surface 29 upon the outside diameter of a shaft is sufficient to minimize or prevent rotation of the shaft relative to ring 10. For example, in one aspect, ring 10 and any structure mounted to ring 10 may become substantially rigidly mounted to a shaft. In another aspect of the invention, the friction provided by the contact between inner surface 29 upon the outside diameter is sufficient to withstand a torsional load of at least 100 foot-pounds of torque, typically, at least 600 foot-pounds of torque, with little or no deflection of the ring 10 relative to the shaft.

In one aspect of the invention, ring 10 may be metallic, for example, made from iron, steel, stainless steel (for example, an AISI 300 series stainless steel, such as AISI 304 or AISI 316), aluminum, nickel, titanium, or any other metal, or a combination of these or other metals. In one aspect of the invention, ring 10 may be made from a plastic, for example, polyethylene (PE), polypropylene (PP), polyester (PE), polytetraflouroethylene (PTFE), acrylonitrile butadiene styrene (ABS), among other plastics. In one aspect of the invention, ring 10 may be made from an elastomeric material, for example, a rubber, such as, natural rubber, neoprene, ethylene-propylene rubber (EDM/EPDM), or styrene-butadiene rubber (SBR); urethane; or polyurethane, among other elastomeric materials.

In one aspect of the invention, surface 29 of inside diameter 12 may be treated to enhance the friction between surface 29 and the surface of the shaft to which ring 10 is mounted. For example, in one aspect, the surface of inside diameter 12 may be treated to roughen the surface, for example, by shot peening, sanding, grinding, or other surface treatment.

In one aspect of the invention, indentations or slots 18 may comprise any indentation in the inner surface 29, for example, any indentations that provide at least some relief to the hoop stress introduced by mounting ring 10 to a shaft. For example, in one aspect of the invention, indentions 18 may comprise circular, square, or rectangular holes. In one aspect of the invention, as shown in FIGS. 1 through 3, indentations 18 may comprise elongated indentations, for example, slits or slots. In one aspect of the invention, indentations 18 may be positioned anywhere on inner surface 29. In one aspect of the invention, indentations 18 may be located at the innermost surface of surface 29, for example, along inside diameter 12.

Also, indentations 18 may be oriented in any desired orientation on surface 29. For example, as shown in FIGS. 1 through 3, indentations 18 may be oriented in an axial direction, that is, in a direction substantially directed along the axis of ring 10. In another aspect of the invention, indentations 18 may be directed at an angle to the axis of ring 10, for example, at an angle between about 5 degrees and about 90 degrees, for example, about 45 degrees, to the axis of ring 10. In one aspect of the invention, indentations 18 may be directed substantially perpendicular to the axis of ring 10, for example, in a substantially circumferential direction. In one aspect of the invention, indentations 18 may comprise one or more circumferential slots or slits, either continuous or intermittent, directed circumferentially about surface 29. In one aspect of the invention, indentations 18 may comprise a plurality of substantially parallel, circumferential slots in inner surface 29. In one aspect of the invention, indentations 18 may comprise blind indentations (for example, blind holes) or through holes, for example, holes that penetrate extension 28. The size of indentations 18 may vary broadly, for example, in one aspect, the smallest dimension of indentation 18, for example, the diameter of holes or the width of slots, may vary from about 0.005 inches to about 3.0 inches, depending upon the size of ring 10. For example, in one aspect of the invention slots 18 in FIGS. 1, 2 and 3 have a length of about 0.10 inches and a depth 21 of about 0.10 inches.

Figure 4:
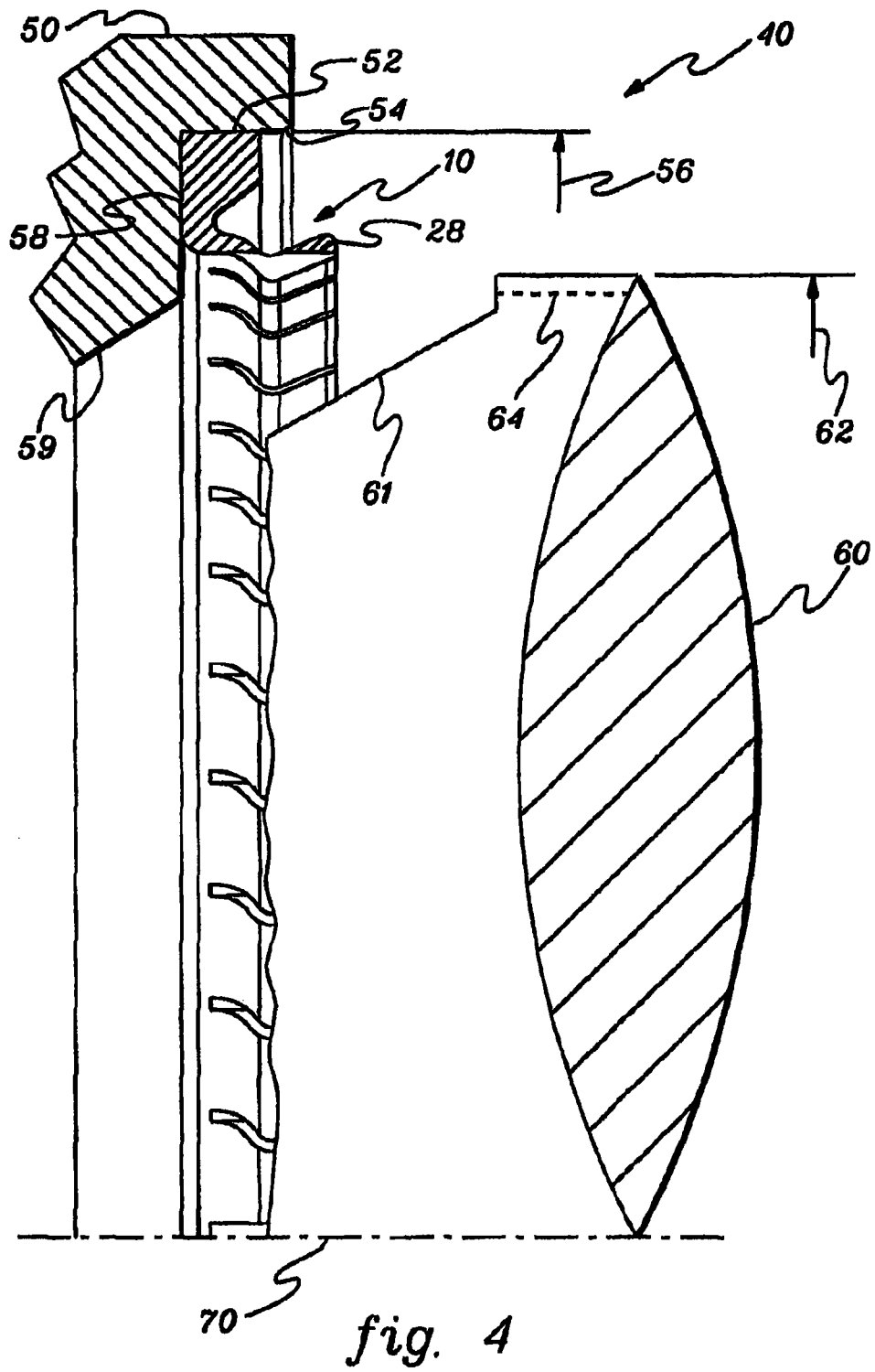
FIGS. 4, 5, and 6 are partial cross-sectional views of the successive assembly of a structure having a ring according to one aspect of the invention when mounted to a shaft.
Figure 5:
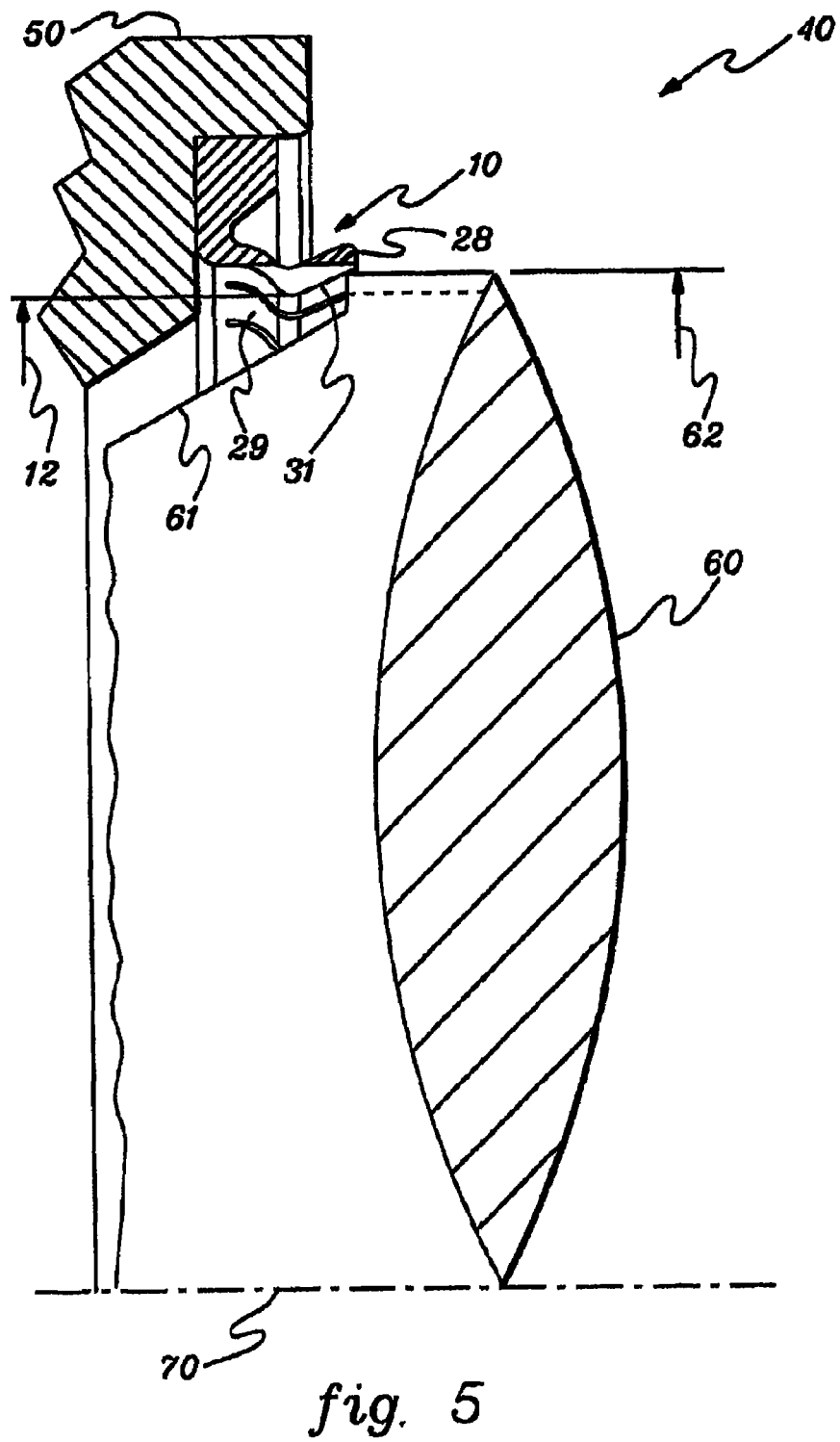
Figure 6:
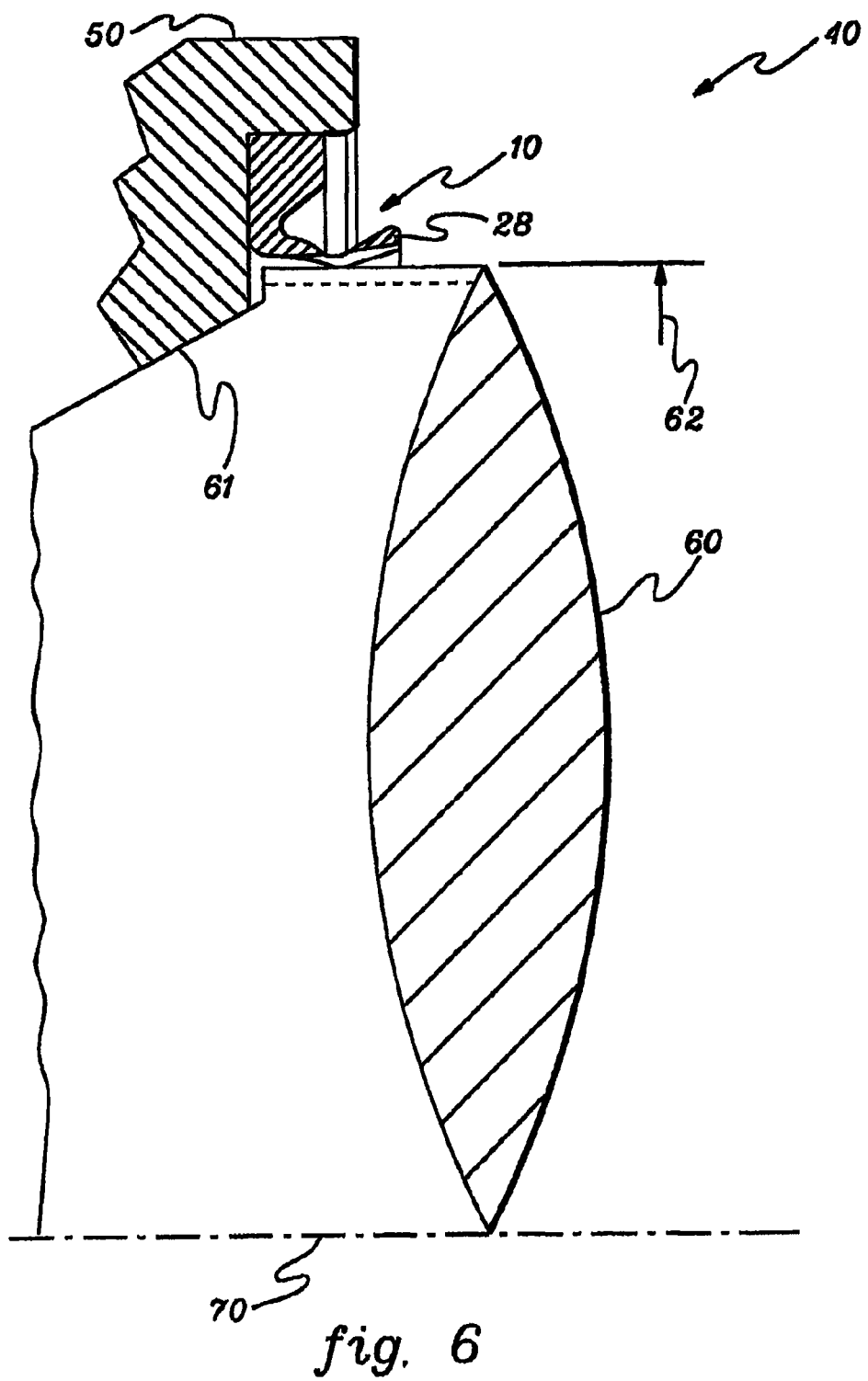

FIGS. 4, 5, and 6 are partial cross-sectional views of an assembly 40 according to another aspect of the invention. FIGS. 4, 5, and 6 illustrate the successive assembly of a structure 50 using a ring 10, according to one aspect of the invention, upon a shaft 60. FIGS. 4, 5, and 6 illustrate only a representative upper half of structure 50, ring 10, and shaft 60 in which each have the substantially common axis 70. In one aspect of the invention, structure 50 may comprise any structure that is desirable to mount to a shaft. Structure 50 may be a plate, for example, a bearing backing plate; a ring; a housing, for example, a bearing housing; or any other type of conventional structure.

In one aspect of the invention, structure 50 may include an internal annular cavity 52 adapted to receive ring 10; for example, cavity 52 may include a lead-in chamfer 54, an outside diameter 56, and a lateral surface 58. Ring 10 may be mounted to cavity 52 by conventional means, for example, by means of welding, by means of an adhesive, by means of one or more mechanical fasteners, by means of a press-fit, or by means of a shrink fit, among other means. In one aspect of the invention, ring 10 and structure 50 may be an integral part, for example, ring 10 and structure 50 may be fabricated (for example, machined, forged, or cast) from one integral piece of material. In one aspect of the invention, structure 50 also includes an internal chamfer 59.

In one aspect of the invention, shaft 60 includes an outer diameter 62. Outer diameter 62 may vary from a nominal dimension as indicated by phantom line 64. For example, diameter 62 may vary by at least about +/−0.005 inches or by at least about +/−0.050 inches, or even at least about +/−0.50 inches. In one aspect of the invention, shaft 60 may be a forged or cast shaft and have an outside diameter that varies by about +/−0.050 inches. In one aspect of the invention, shaft 60 may be a train axle, for example, a forged or cast train axle having an outside diameter that has a tolerance of about +/−0.050 inches. In this aspect of the invention, structure 50 may comprise a bearing backing plate and ring 10 may be used to mount the bearing backing plate to the forged or cast shaft 60. As shown in FIGS. 4, 5, and 6, shaft 60 may include a chamfer 61.

FIG. 4 illustrates assembly 40 prior to when ring 10 engages shaft 60. FIG. 5 illustrates assembly 40 as ring 10 begins to engage the outside diameter 62 of shaft 60. As shown in FIG. 5, in this stage of assembly, inside diameter 12 of ring 10 is less than the outside diameter 62 of shaft 60. According to this aspect of the invention, inner surface 29 of ring 10 is adapted to engage shaft 60 whereby inner surface 29 radially deflects to increase inside diameter 12. As shown in FIG. 5, according to one aspect of the invention, the section of inner surface 29 of ring 10 that engages shaft 60 may comprise a ramped or chamfered surface 31. This chamfered surface 31 causes surface 29 to radially deflect when contacted by outside diameter 62 of shaft 60 whereby inside diameter 12 increases to accommodate outside diameter 62.

FIG. 6 illustrates assembly 40 after ring 10 has engaged outside diameter 62 of shaft 60 As shown in FIG. 6, inside diameter 12 of resilient ring 10 has deflected to a diameter of at least outside diameter 62. According to this aspect of the invention, the deflection of extension 28 during engagement of ring 10 with shaft 60 introduces circumvention stress (or hoop stress) in extension 28 that causes compression between the inner surface 29 of ring 10 and the outside diameter 62 of shaft 60. According to the present invention, this compression between inner surface 29 and outside diameter 62 is sufficient to provide at least some resistance, for example, some frictional resistance, to the rotation of shaft 60 relative to ring 10. In one aspect of the invention, the resistance to the relative rotation of shaft 60 and ring 10 is sufficient whereby ring 10, and structure 50, are substantially mounted to shaft 60, for example, rigidly mounted to shaft 60. In another aspect of the invention, at least some resistance to axial deflection may be provided. For example, in one aspect, the mounting of ring 10 onto shaft 60 may be capable of withstanding an axial load of at least about 500 pounds, at least about 1000 pounds, at least about 1500 pounds, or even more, with little or no axial deflection. It will be apparent to those of skill in the art that the amount of torsional and/or axial resistance to movement will be dependent upon the dimensions of ring 10 and the application to which ring 10 is applied.

In one aspect of the invention, the resistance to relative rotation of shaft 60 with respect to ring 10 may be enhanced by treating either inner surface 29 of ring 10, outside diameter 62 of shaft 60, or both. For example, in one aspect of the invention inner surface 29 or outside diameter 62 may be treated with a friction increasing material, for example, an adhesive. In another aspect of the invention, the friction between surface 29 and outside diameter 62 may be enhanced by treating one or both surfaces, for example, by shot peening, sanding, grinding, or other surface treatment.

In another aspect of the invention, resistance to relative movement between inner surface 29 and outside diameter 62 may be enhanced by indentations 18. For example, in this aspect of the invention, indentations 18, or more specifically, the edges of indentations 18, may contact the outside diameter 62 to provide at least some resistance to relative rotation and/or axial deflection. In one aspect of the invention, surface 29 having indentations 18 may comprise a material that is harder than the material of outside diameter 62, for example, whereby the harder edges of indentations 18 penetrate at least some of the surface of outside diameter 62 to increase the resistance to relative motion between the mating surfaces.

Figure 7:
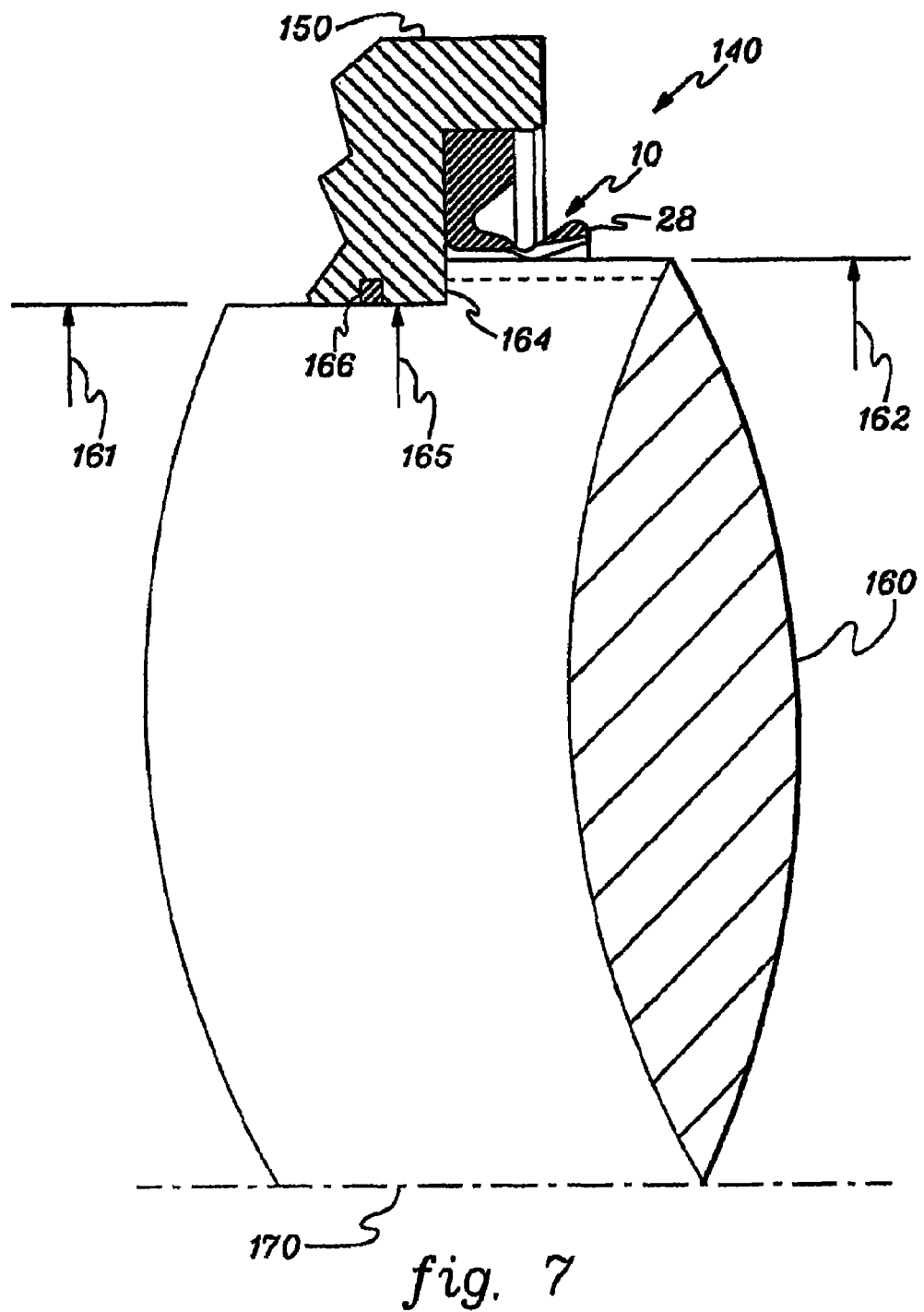
FIG. 7 is partial cross-sectional view, similar to FIG. 6, of another assembly of a structure having a ring according to an aspect of the invention when mounted to another shaft.

FIG. 7 is partial cross-sectional view, similar to FIG. 6, of another assembly 140 of a structure 150 and ring 10 having flexible extension 28 mounted to another shaft 160 according to an aspect of the invention. FIG. 7 illustrates only a representative upper half of structure 150, ring 10, and shaft 160 in which each have the substantially common axis 170. Structure 150 includes a cavity 152 for accepting and retaining ring 10 in a manner similar to that described with respect to FIGS. 4, 5, and 6. Unlike shaft 60 of FIG. 4, shaft 160 does not include a chamfer, such a chamfer 61 in FIG. 4. As shown in FIG. 7, according to one aspect of the invention, ring 10 may be used to mount structure 150 onto shaft 160 having a first outside diameter 161 and a second outside diameter 162, the second outside diameter 162 being equal to or greater than the first outside diameter 161. As shown in FIG. 7, first outside diameter 161 and second outside diameter 162 may define a step 164 in shaft 160 According to this aspect of the invention, structure 150 has an inside diameter 165 that is greater than first outside diameter 161 of shaft 160. In one aspect of the invention, when mounted to shaft 160, extension 128 of ring 10 may deflect during assembly (in a fashion similar to what is shown in FIGS. 4, 5, and 6) and bear against second outside 162 when assembled. Also, when mounted to shaft 160, structure 150 may bear against step 164. In one aspect of the invention, structure 150 may include some sealing means 166, for example, an o-ring or wiper seal, positioned on inside diameter 165 to provide at least some fluid seal between structure 150 and shaft 160.

Figure 8:
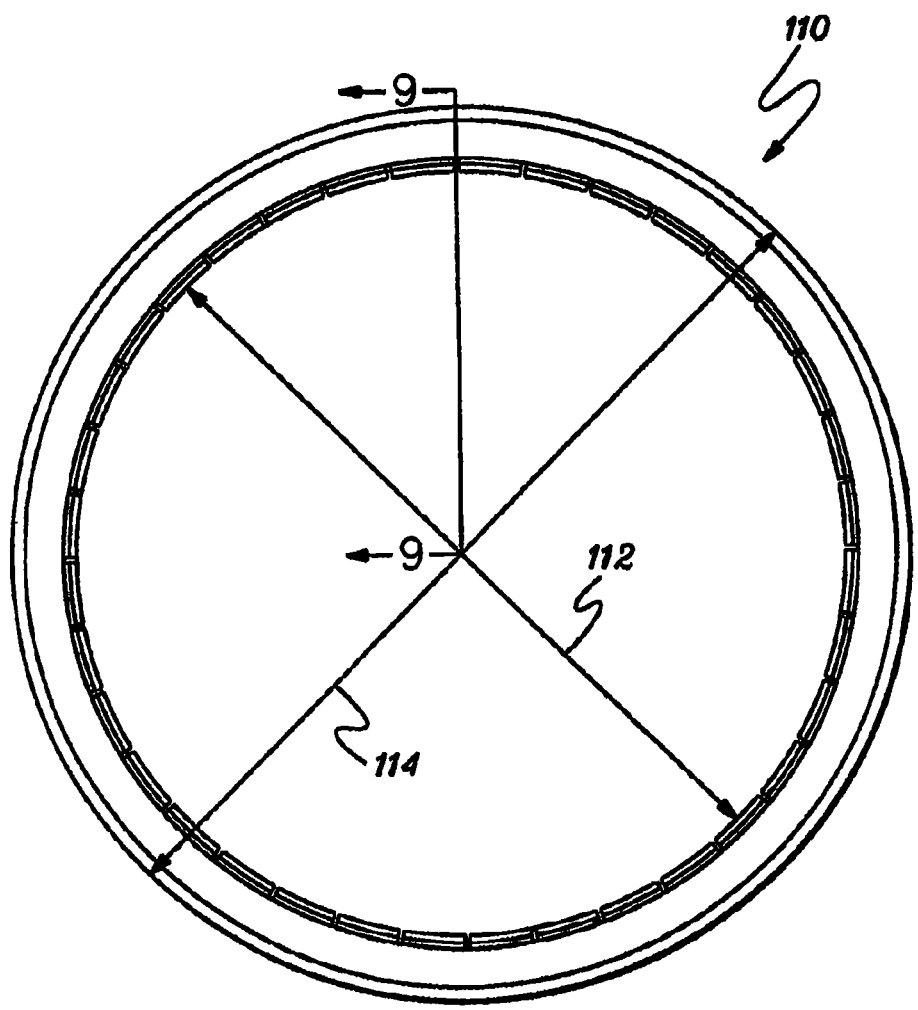
FIG. 8 is a plan view of a ring according to another aspect of the invention.
Figure 9:
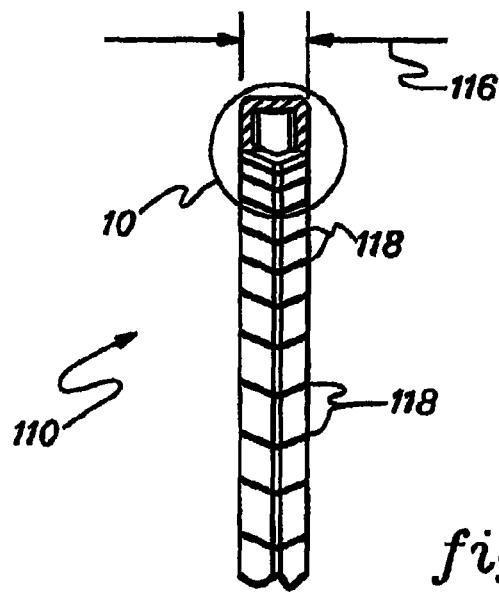
FIG. 9 is a partial cross-sectional view of the ring shown in FIG. 8 as viewed along section lines 9-9 in FIG. 8.
Figure 10:
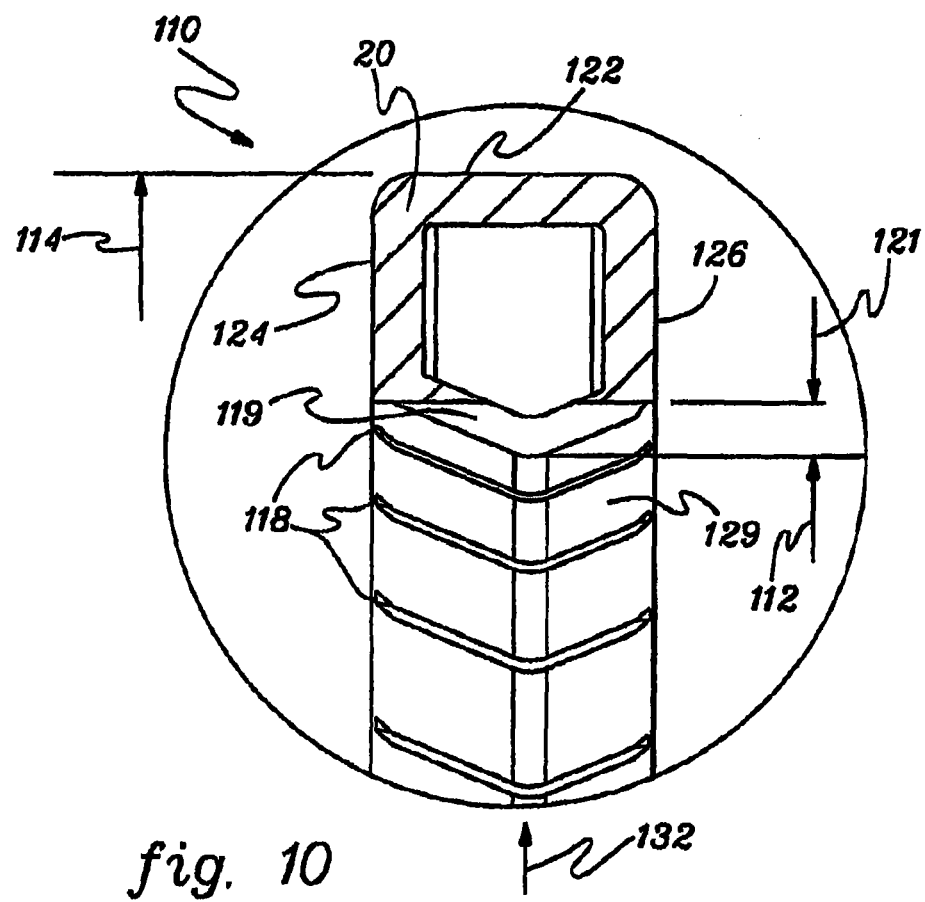
FIG. 10 is a magnified detailed view of the cross-sectional shape identified by circle 10 in FIG. 8 according to another aspect of the invention.

FIGS. 8, 9, and 10 illustrate a ring 110 according to another aspect of the present invention. FIGS. 8, 9, and 10 of ring 110 are similar to the views of ring 10 shown in FIGS. 1, 2, and 3. FIG. 8 is a plan view of ring 110. Ring 110 may have many of the attributes of ring 10 discussed with respect to and illustrated in FIGS. 1-6. Ring 110 has an inside diameter 112 and an outside diameter 114. FIG. 9 is a partial cross-sectional view of ring 110 shown in FIG. 8 as viewed along section lines 9-9 in FIG. 8. As shown in FIG. 9, ring 110 has a width 116 and, according to this aspect of the present invention, at least one indentation 118, for example, a slot or slit, and typically a plurality of indentations 118. As discussed with respect to ring 10, indentations 118 of ring 110 may take many different forms. However, again, to facilitate this discussion, indentations 118 will be referred to as a "slots" in the following discussion. FIG. 10 is a magnified detailed view of the cross section of ring 110 identified by circle 10 in FIG. 9. As shown in FIG. 10, section 9-9 shown in FIG. 8, passes through a slot 118 whereby a lateral surface 119 of slot 118 is shown without cross hatching in FIGS. 9 and 10.

In one aspect of the invention, inside diameter 112, outside diameter 114, and width 116 may be sized similar to inside diameter 12, outside diameter 14, and width 16 of ring 10.

As shown in FIG. 10, unlike ring 10, the cross section of ring 110 is a closed, hollow rectangular structure or construction (for example, form or shape) having an outer surface 122 (comprising outside diameter 114), a first lateral surface 124, and a second lateral surface 126, opposite first lateral surface 124, and an inner surface 129 (comprising inside diameter 112). In one aspect of the invention, the closed hollow structure of the cross-section of ring 110 may take many shapes and forms, for example, the closed hollow shape of ring 110 may be circular, square, oval, elliptical, rectangular, triangular, or comprise any other polygonal shape having linear or curvilinear sides, including a pentagonal, a hexagonal, a septagonal, and a octagonal hollow construction. As discussed above, the shape and cross-section of ring 110 may be provided to accommodate the shape and function of the structure (not shown) that is mounted to ring 110.

In one aspect of the invention, as shown in FIG. 10, inner surface 129 of ring 110 may be "v-shaped" where the side surfaces of inner surface 129 converge to a rounded ridge which defines inner diameter 112. In other aspects of the invention surface 129 may take other shapes, for example, a semicircular, oval, square, or rectangular, among others. According to this aspect of the invention, and similar to ring 10, ring 110 is adapted to be flexible or resilient, and deflect or deform under load, for example, deflect or deform under a load represented by arrow 132 in FIG. 10. The deflection or deformation of ring 110 under load may comprise elastic deflection or plastic deflection.

According to this aspect of the invention, ring 110 may be mounted to another structure (not shown), for example, a structure mounted to one or more surfaces 122, 124, and 126. Ring 110 may be mounted to a shaft (not shown) whereby inside diameter 112 is allowed to deflect or deform, for example, deflect or deform to accommodate any deviation from the diameter of the shaft from the inside diameter 112 of ring 110.

In one aspect of the invention, again, similar to ring 10, slots 118 or ring 110 may be introduced to inner surface 129. For example, slots 118 may be provided to relieve at least some of the circumferential or "hoop" stress that may be created when mounting ring 110 onto a shaft. In one aspect of the invention, slots 118 provide at least some resiliency to ring 10 whereby inside diameter 112 may deflect under load. Slots 118 may have a depth 121. Depth 121 may vary, for example, depending upon the degree of stress relief desired. In one aspect, as shown in FIG. 10, the depth 121 of slot 118 is sufficient to penetrate through a side of ring 110 whereby slots 118 penetrate the inner surface of the side associated with surface 129. In another aspect of the invention, slots 118 do not penetrate through the sides of ring 110.

Similar to ring 10, in one aspect of the invention, the diameter of the shaft (not shown) to which ring 110 is mounted has a diameter, for example, a nominal diameter, that may be greater than inside diameter 112. This diameter may vary and may be greater than inside diameter 112 in some places and less than inside diameter 112 in other places. However, according to aspects of the present invention, deviations in the diameter of the shaft are accommodated by the flexibility of inside diameter 112, for example, the flexibility provided by slots 118. In one aspect of the invention, the flexibility of ring 110 is sufficient to accommodate a shaft diameter whereby no indentations or slots 118 are required.

Again, similar to ring 10, in one aspect of the invention, ring 110 may provide at least some fluid sealing between one side of ring 110 and the other side of ring 110. As discussed above with respect to ring 10, in one aspect, a sealing compound or a sealing device may be provided at the interface of the ring 110 and the shaft to which ring 110 is mounted before, during, or after ring 110 is mounted. For example, in one aspect, an RTV silicone rubber or a resilient device may be applied to the interface of ring 110 and the shaft, as described above with respect to ring 10.

According to one aspect of the invention, similar to ring 10, when ring 110 is mounted on to a shaft, the normal load provided by the contact of inner surface 129 upon the outside diameter of the shaft is sufficient to provide at least some friction between the outside diameter of the shaft and inner surface 129 whereby at least some resistance, for example, some torsional resistance, is provided to the rotation of the shaft relative to ring 110. In another aspect of the invention, the friction provided by the contact between inner surface 129 upon the outside diameter of a shaft is sufficient to minimize or prevent rotation of the shaft relative to ring 110. For example, in one aspect, ring 110, and any structure mounted to ring 110, may become substantially rigidly mounted to a shaft. In another aspect of the invention, the friction provided by the contact between inner surface 129 upon the outside diameter is sufficient to withstand a torsional load of at least 100 foot-pounds of torque, typically, at least 600 foot-pounds of torque, with little or no deflection of the ring 110 relative to the shaft. In another aspect of the invention, at least some resistance to axial deflection may be provided. For example, in one aspect, the mounting of ring 110 onto a shaft may be capable of withstanding an axial load of at least about 500 pounds, at least about 1000 pounds, at least about 1500 pounds, or even more, with little or no axial deflection. It will be apparent to those of skill in the art that the amount of torsional and/or axial resistance to movement will be dependent upon the dimensions of ring 110 and the application to which ring s10 is applied.

In one aspect of the invention, ring 110 may be metallic or plastic, and may be fabricated from one or more of the materials discussed above with respect to ring 10, for example, from an AISI 300 series stainless steel. In one aspect of the invention, similar to ring 10, surface 129 of inside diameter 112 may be treated to enhance the friction between surface 129 and the surface of the shaft to which ring 110 is mounted. In one aspect of the invention, indentations or slots 118 of ring 110 may comprise any indentation in the inner surface 129. For example, slots 118 may comprise any indentations that provide at least some relief to the hoop stress introduced by mounting ring 110 to a shaft. For example, indentations 118 may comprise one or more of the indentation shapes, locations, orientations, configurations, and sizes discussed above with respect to ring 10.

According to one aspect of the invention, ring 110 may be mounted to a shaft in a manner similar to that shown in FIGS. 4, 5, 6, and 7.

Figure 11:
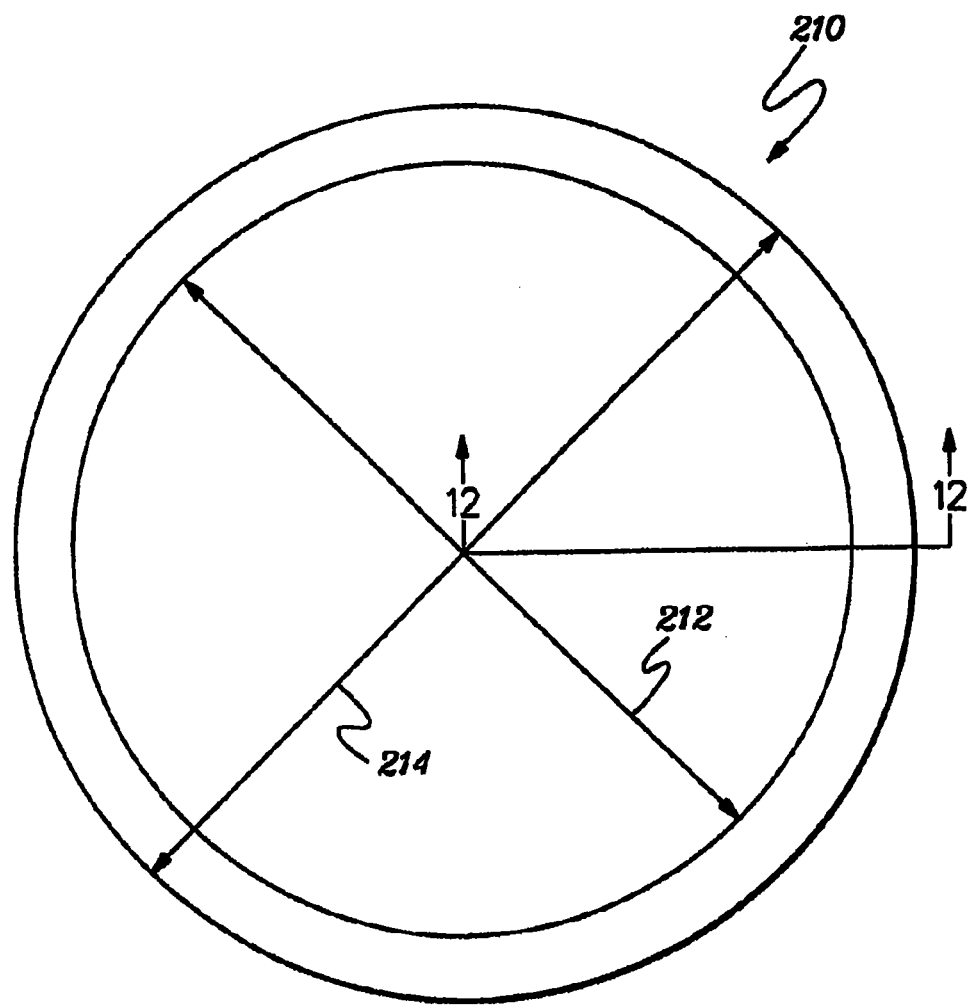
FIG. 11 is a plan view of a ring according to another aspect of the invention.
Figure 12:
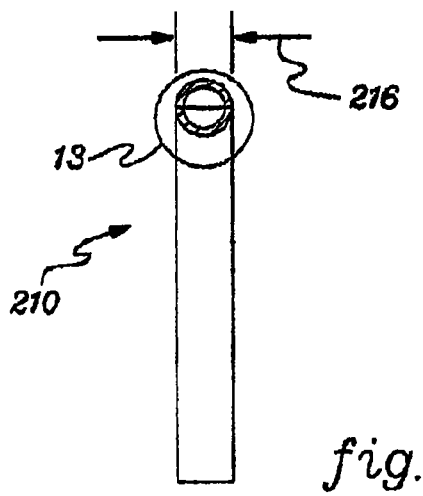
FIG. 12 is a partial cross-sectional view of the ring shown in FIG. 11 as viewed along section lines 12-12 in FIG. 11.
Figure 13:
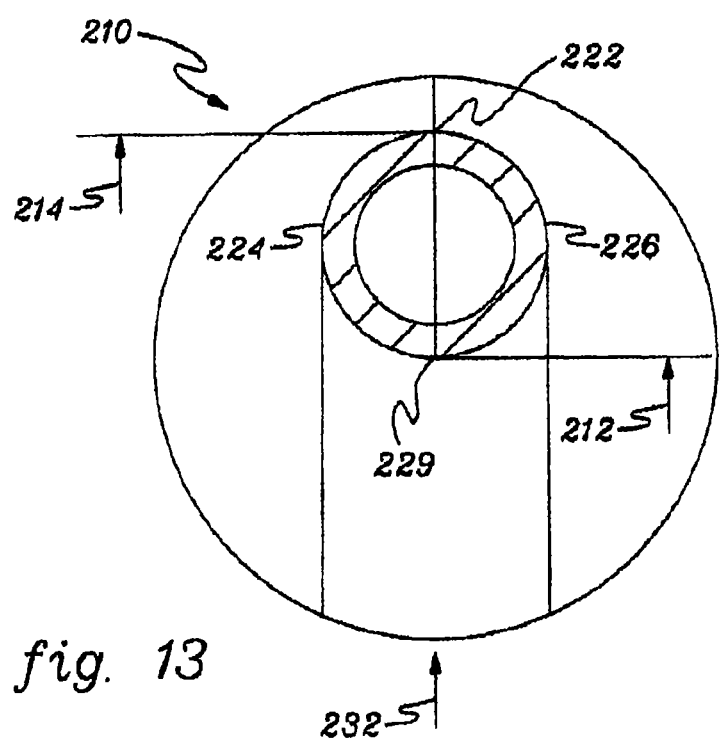
FIG. 13 is a magnified detailed view of the cross-sectional shape identified by circle 13 in FIG. 12 according to another aspect of the invention.

FIGS. 11, 12, and 13 illustrate a ring 210 according to another aspect of the present invention. FIGS. 11, 12, and 13 of ring 210 are similar to the views of ring 10 shown in FIGS. 1, 2, and 3 and ring 110 shown in FIGS. 8, 9, and 10. FIG. 11 is a plan view of ring 210. Ring 210 may have many if not all the attributes of rings 10 and 110 discussed with respect to and illustrated in FIGS. 1-10. Ring 210 has an inside diameter 212 and an outside diameter 214. FIG. 12 is a partial cross-sectional view of ring 210 shown in FIG. 11 as viewed along section lines 12-12 in FIG. 11. As shown in FIG. 12, ring 210 has a width 216. Though in one aspect of the invention ring 210 may include at least one slot, slit, or indentation along the surface defined by inside diameter 212, for example, the slots 18 and 118 discussed with respect to other aspects of the invention, according to one aspect of the invention, ring 210 includes no slots, slits, or indentations about its inside diameter 212. The omission of slots, slits, or indentations in ring 210 provides the further advantage of providing a device that is easier and less expensive to fabricate. For example, the machining of a plurality of indentations in the inside diameter of ring 210 may be costly and time consuming. In addition, the omission of indentations, for example, in ring 210 also reduces or eliminates possible paths of fluid leakage. Thus, aspects of the invention require less or no sealing means, for example, RTV sealant, compared to aspects with indentations. FIG. 13 is a magnified detailed view of the cross section of ring 210 identified by circle 13 in FIG. 12.

As shown in FIG. 13, unlike ring 10, but similar to ring 110, the cross section of ring 210 is a closed, hollow circular structure or construction (for example, form or shape) having an outer surface or portion 222 (comprising outside diameter 214), a first lateral surface or portion 224, and a second lateral surface or portion 226 opposite first lateral surface or portion 224, and an inner surface or portion 229 (comprising inside diameter 212). In one aspect of the invention, the closed hollow structure of the cross-section of ring 210 may take many shapes and forms, for example, the closed hollow shape of ring 210 may be square, oval, elliptical, rectangular, triangular, or comprise any other polygonal shape having linear or curvilinear sides, including a pentagonal, a hexagonal, a heptagonal, and a octagonal hollow construction, among others. As discussed above with respect to rings 10 and 110, the shape and cross-section of ring 210 may be provided to accommodate the shape and function of the structure (not shown) that is mounted to ring 210, for example, one or more planar sides to accommodate a planar surface of the structure.

In one aspect of the invention, and similar to rings 10 and 110, ring 210 is adapted to be flexible or resilient, and deflect or deform under load, for example, deflect or deform under a load represented by arrow 232 in FIG. 13. The deflection or deformation of ring 210 under load may comprise elastic deflection or plastic deflection.

Similar to rings 10 and 110, according to one aspect of the invention, ring 210 may be mounted to another structure (not shown), for example, a structure mounted to one or more surfaces 222, 224, and 226. Ring 210 may be mounted to a shaft (not shown) whereby inside diameter 212 is allowed to deflect or deform, for example, deflect or deform to accommodate any deviation from the diameter of the shaft from the inside diameter 212 of ring 210.

In one aspect of the invention, again, similar to rings 10 and 110, slots or indentations (not shown) may be introduced to inner surface 229. For example, slots or indentations may be provided to relieve at least some of the circumferential or "hoop" stress that may be created when mounting ring 210 onto a shaft. For a description of the slots or indentations that may be provided refer to the corresponding description of slots 18 and 118 above. In one aspect of the invention, slots or indentations provide at least some resiliency to ring 210 whereby inside diameter 212 may deflect under load. However, in one aspect, no slots or indentations are provided.

Similar to rings 10 and 110, in one aspect of the invention, the diameter of the shaft (not shown) to which ring 210 is mounted has a diameter, for example, a nominal diameter, that may be greater than inside diameter 212. This diameter may vary and may be greater than inside diameter 212 in some places and less than inside diameter 212 in other places. However, according to aspects of the present invention, deviations in the diameter of the shaft are accommodated by the flexibility of inside diameter 212, even without slots or indentations.

Again, similar to rings 10 and 110, in one aspect of the invention, ring 210 may provide at least some fluid sealing between one side of ring 210 and the other side of ring 210. As discussed above with respect to rings 10 and 110, in one aspect, a sealing compound or a sealing device may be provided at the interface of the ring 210 and the shaft to which ring 210 is mounted before, during, or after ring 210 is mounted. For example, in one aspect, an RTV silicone rubber or a resilient device may be applied to the interface of ring 210 and the shaft, as described above with respect to rings 10 and 110.

According to one aspect of the invention, similar to rings 10 and 110, when ring 210 is mounted on to a shaft, the normal load provided by the contact of inner surface 229 upon the outside diameter of the shaft is sufficient to provide at least some friction between the outside diameter of a shaft and inner surface 229 whereby at least some resistance, for example, some torsional resistance, is provided to the rotation of the shaft relative to ring 210. In another aspect of the invention, the friction provided by the contact between inner surface 229 upon the outside diameter of a shaft is sufficient to minimize or prevent rotation of the shaft relative to ring 210. For example, in one aspect, ring 210, and any structure mounted to ring 210, may become substantially rigidly mounted to a shaft. In another aspect of the invention, the friction provided by the contact between inner surface 229 upon the outside diameter of a shaft is sufficient to withstand a torsional load of at least 100 foot-pounds of torque, typically, at least 600 foot-pounds of torque, with little or no deflection of the ring 210 relative to the shaft. In another aspect of the invention, at least some resistance to axial deflection may be provided. For example, in one aspect, the mounting of ring 210 onto a shaft may be capable of withstanding an axial load of at least about 500 pounds, at least about 1000 pounds, at least about 1500 pounds, or even more, with little or no axial deflection. It will be apparent to those of skill in the art that the amount of torsional and/or axial resistance to movement will be dependent upon the dimensions of ring 210 and the application to which ring 210 is applied.

In one aspect of the invention, ring 210 may be metallic or plastic, and may be fabricated from one or more of the materials discussed above with respect to rings 10 and 110, for example, from an AISI 300 series stainless steel. In one aspect of the invention, similar to rings 10 and 110, surface 229 of inside diameter 212 may be treated to enhance the friction between surface 229 and the surface of the shaft to which ring 210 is mounted. In one aspect of the invention, where ring 210 includes indentations or slots (not shown), these slots or indentations may comprise any indentation in the inner surface 229, as described with respect to slots 18 and 118. For example, slots in ring 210 may comprise one or more of the indentation shapes, locations, orientations, configurations, and sizes discussed above with respect to rings 10 and 110.

In one aspect of the invention, inside diameter 212, outside diameter 214, and width 216 may be sized similar to inside diameters 12, 112 outside diameter 14, 114 and width 16, 116 of rings 10 and 110, respectively. However, it will be understood by those of skill in the art that the dimensions of ring 210 and the conditions of its installation will vary depending upon the application in which ring 210 is used, for example, the size of the shaft to which ring 210 is mounted and the expected torsional and/or axial loads ring 210 must be designed to withstand. In one aspect of the invention, the shaft to which ring 210 may be mounted may have an outside diameter of about 8 inches. In this application, the width or diameter 216 of ring 210 may be about 0.375 inches and have a wall thickness of about 0.035 inches. However, in other aspects of the invention these dimensions may vary broadly. For example, in one aspect, the diameter of the shaft with which ring 210 is used may have a diameter ranging from about 0.03125 inches (that is, $\frac{1}{32}$ inch) to 10 feet, but may typically be between about 2 inches and about 20 inches in diameter. In another aspect of the invention, ring 210 may have a width 216 of between about 0.03125 inches and about 3 inches, but may typically be between about 0.25 inches and about 0.75 inches in width. In one aspect of the invention, ring 210 may have a wall thickness of between about 0.010 inches and about 1 inch, but may typically be between about 0.020 inches and about 0.25 inches in wall thickness. In one aspect of the invention, ring 210 may not be hallow, but may have a solid cross-section. For example, in one aspect, ring 210 may comprise a solid ring having a width or diameter 216 of between 0.03125 inches (that is, 1/32 inch) and about 0.25 inches, for example, made from a 1/8-inch solid wire. In one aspect of the invention, the amount of nominal, pre-assembly interference between the inside diameter 212 of ring 210 and the outside diameter of the shaft upon which ring 210 is mounted may range from about 0.010 inches to about 0.100 inches, but may typically be between about 0.015 inches and about 0.065 inches. Similarly, the nominal, pre-assembly interference between the outside diameter 214 of ring 210 and the inside diameter of the housing into which ring 210 is mounted may range from about 0.001 inches to about 0.050 inches, but may typically be between about 0.005 inches and about 0.015 inches.

Again, those of skill in the art will recognize that the dimensions of ring 210 and the amount of interference between the housing and the shaft may vary broadly and may be contingent upon the application and loading for which ring 210 will be used. For example, a larger interference between the inside diameter of the housing into which ring 210 is mounted and the outside diameter 214 of ring 210 will affect the flexibility of the ring and thus affect the amount of interference that can be tolerated between the inside diameter 212 and the shaft to which ring 210 is mounted. Similar tradeoffs must be considered in aspects of the invention where ring 210 includes slots or indentions along inside diameter 212.

Figure 14:
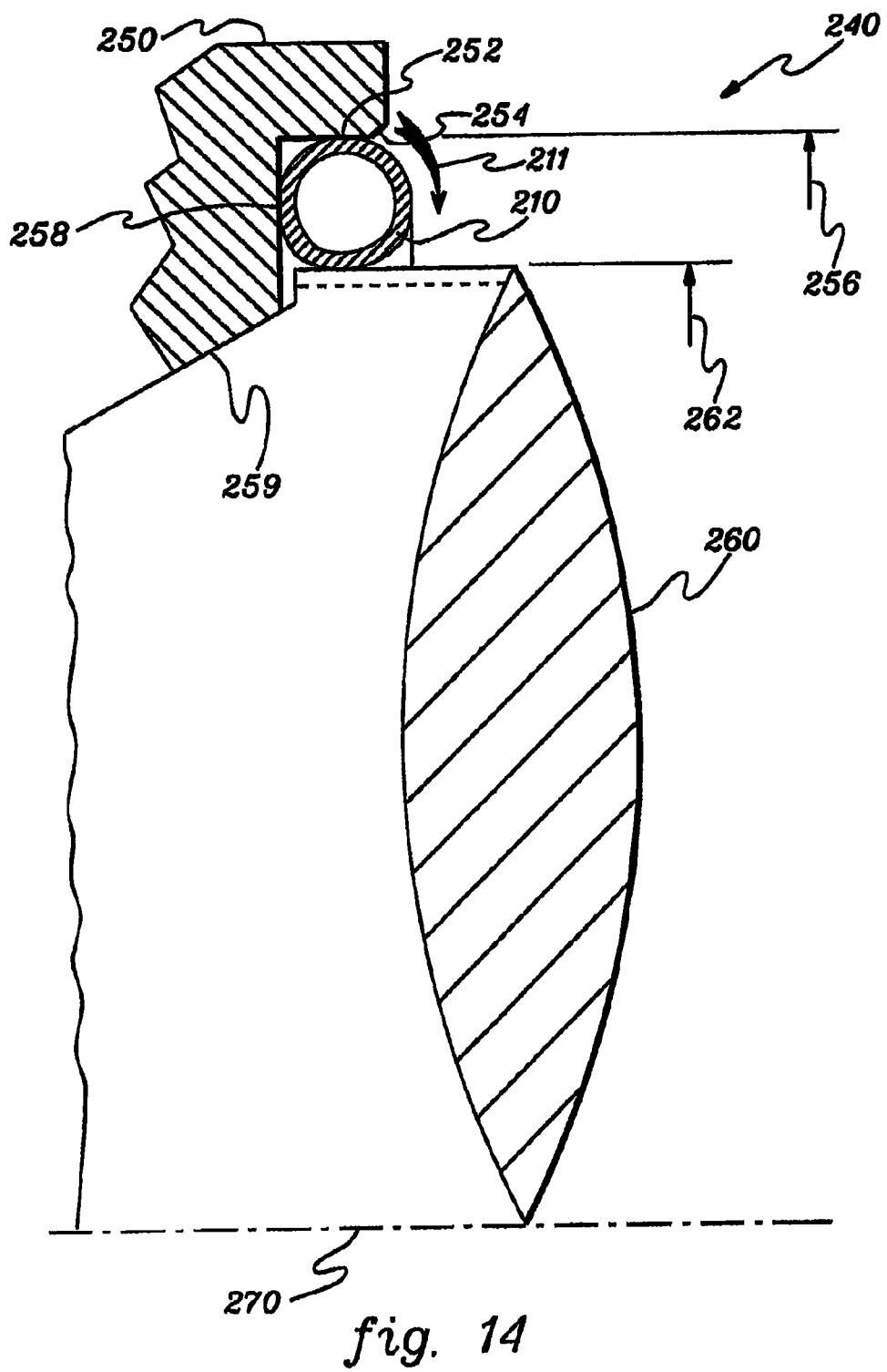
FIG. 14 is a partial cross-sectional view, similar to FIG. 6, of another assembly of a structure having a ring according to an aspect of the invention when mounted to another shaft.

According to one aspect of the invention, ring 210 may be mounted to a shaft in a manner similar to that shown in FIGS. 4, 5, 6, and 7. FIG. 14 is a partial cross-sectional view of an assembly 240 according to another aspect of the invention. FIG. 14 represents the final assembled state of a structure 250 and ring 210 on a shaft 260. Shaft 260 has an outside diameter 262. These may be assembled as shown, for example, in FIGS. 4, 5, and 6, according to another aspect of the invention. As did FIGS. 4, 5, 6, and 7, FIG. 14 illustrates only a representative upper half of structure 250, ring 210, and shaft 260 in which each have the substantially common axis 270. In one aspect of the invention, structure 250 may comprise any structure that is desirable to mount to a shaft. Structure 250 may be a plate, for example, a bearing backing plate; a ring; a housing, for example, a bearing housing; or any other type of conventional structure.

In one aspect of the invention, structure 250 may include an internal annular cavity 252 adapted to receive ring 210; for example, cavity 252 may include a lead-in chamfer 254, an outside diameter 256, and a lateral surface 258. Ring 210 may be mounted to cavity 252 by conventional means, for example, by means of welding, by means of an adhesive, by means of one or more mechanical fasteners, by means of a press-fit, or by means of a shrink fit, among other means. In one aspect of the invention, ring 210 and structure 250 may be an integral part, for example, ring 210 and structure 250 may be fabricated (for example, machined, forged, or cast) from one integral piece of material. In one aspect of the invention, structure 250 also includes an internal chamfer 259.

As shown in FIG. 14, inside diameter 212 of ring 210 has deflected to a diameter of at least about outside diameter 262. According to this aspect of the invention, the interaction of ring 210 with shaft 260 may cause at least some rotation or deflection of ring 210 in the direction indicated by arrow 211. However, in one aspect of the invention, ring 210 experiences little or no rotation or deflection, but is simply deformed as shown in FIG. 14. The rotation, deflection, and/or deformation of ring 240 as ring 240 engages shaft 260 introduces at least some circumvention stress (or hoop stress) in ring 210 that causes compression between the inner surface 229 (see FIG. 13) of ring 210 and the outside diameter 262 of shaft 260. According to the present invention, this compression between inner surface 229 and outside diameter 262 is sufficient to provide at least some resistance, for example, some frictional resistance, to the rotation of shaft 260 relative to ring 210. That is, in one aspect, the means for allowing the inner diameter of the metallic ring to deform and avoid movement of the shaft relative to the ring when the ring is slidably and coaxially mounted on the shaft is the wall thickness of the cross section of the ring sized to deform when the ring is coaxially mounted on the shaft. In one aspect of the invention, the resistance to the relative rotation of shaft 260 and ring 210 is sufficient whereby ring 210 and structure 250 are substantially mounted to shaft 260, for example, rigidly mounted to shaft 260. In another aspect of the invention, at least some resistance to axial deflection may be provided, as described above.

In one aspect of the invention, rings 10, 110, and 210 may be fabricated from a continuous coil; for example, the cross-sections of rings 10, 110, and 210 may be extruded into a continuous coil. The continuous coil may then be cut to length and the free ends of the cut length may be attached to each other, for example, by welding, to form ring 10, 110, or 210.

Aspects of the present invention provide devices and methods for mounting structures onto shafts. As will be appreciated by those skilled in the art, features, characteristics, and/or advantages of the various aspects described herein, may be applied and/or extended to any embodiment (for example, applied and/or extended to any portion thereof).

Although several aspects of the present invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. A mounting ring comprising:
    a main section comprising a surface with a substantially constant outermost diameter that is also the outermost diameter of the mounting ring;
    a projection extending axially from said main section, said projection located at a diameter less than said outermost diameter of said main section;
    said projection comprising a first annular ring section that extends inwardly away from said outermost diameter and terminates at an innermost diameter of said projection and a second annular ring section that extends from said innermost diameter of said projection and outwardly toward said outermost diameter, said first and second annular ring sections forming a radially inner surface adapted to flexibly engage a shaft to which the mounting ring is mounted to substantially prevent axial movement of the mounting ring relative to the shaft under an axial load to the mounting ring; and
    said main section and said projection bounding a cavity such that said main section extends in an axial direction less than said projection extends in said axial direction.

2. The mounting ring as recited in claim 1, wherein the radially inner surface is adapted to flexibly engage the shaft to substantially prevent rotation of the mounting ring relative to the shaft under a load of at least 100 foot-pounds of torque.

3. The mounting ring as recited in claim 2, wherein the radially inner surface is adapted to flexibly engage the shaft to substantially prevent the rotation of the shaft relative to the mounting ring under a load of at least 600 foot-pounds of torque.

4. The mounting ring as recited in claim 1, wherein the radially inner surface is adapted to flexibly engage the shaft to substantially prevent axial movement of the mounting ring relative to the shaft under an axial load of at least 1000 pounds.

5. The mounting ring as recited in claim 4, wherein the radially inner surface is adapted to flexibly engage the shaft to substantially prevent axial movement of the mounting ring relative to the shaft under an axial load of at least 1500 pounds.

6. The mounting ring as recited in claim 1, wherein said surface of the main section comprises a smooth and continuous outer surface.

7. The mounting ring as recited in claim 1, wherein the mounting ring further comprises a contacting surface adapted to mount the mounting ring to a plate, a ring, or a housing.

8. The mounting ring as recited in claim 1, wherein the mounting ring is made from one or more of iron, steel, aluminum, nickel, and titanium.

9. The mounting ring as recited in claim 1, wherein the radially inner surface of the projection comprises one or more slits, slots, and holes.

10. The mounting ring as recited in claim 1, wherein the radially inner surface of the projection comprises one or more axial slits.

11. The mounting ring as recited in claim 1, wherein the mounting ring further comprises a substantially fluid-tight seal between the mounting ring and the shaft.

12. The mounting ring as recited in claim 1, wherein the mounting ring comprises at least one of a circular, an oval, and a polygonal closed cross-section.

13. The mounting ring as recited in claim 1, wherein the radially inner surface is adapted to flexibly engage the shaft by at least one of elastic deflection and plastic deflection.

14. The mounting ring as recited in claim 1, further comprising a structure adapted to mount the mounting ring to an axle of a train.

15. The mounting ring as recited in claim 14, wherein the structure comprises a plate, a ring, or a housing.

16. The mounting ring as recited in claim 14, wherein the structure comprises a bearing backing plate.

17. The mounting ring as recited in claim 1, wherein the radially inner surface of the projection comprises one or more indentations that do not penetrate through the mounting ring.

18. A mounting ring comprising:
   a main section comprising an outer surface with a substantially constant outermost diameter that is also the outermost diameter of the mounting ring;
   a projection extending axially from said main section and annularly within said mounting ring such that substantially all radial cross sections of said projection are congruent, said projection located at a diameter less than said outermost diameter of said main section;
   said projection comprising a radially inner surface adapted to flexibly engage a shaft to which the mounting ring is mounted to substantially prevent axial movement of the mounting ring relative to the shaft under an axial load to the mounting ring; and
   said main section and said projection bounding a cavity such that said main section extends in an axial direction less than said projection extends in said axial direction.

19. The mounting ring as recited in claim 18, wherein the radially inner surface of the projection comprises one or more indentations, and wherein a radial cross section of said projection at the location of said one or more indentations lacks congruency with radial cross sections of said projection not located at said one or more indentations.

20. The mounting ring as recited in claim 18, further comprising a structure adapted to mount the mounting ring to an axle of a train.

\* \* \* \* \*